United States Patent
Van Lammeren et al.

(10) Patent No.: US 7,454,188 B2
(45) Date of Patent: Nov. 18, 2008

(54) VERSION-PROGRAMMABLE CIRCUIT MODULE

(75) Inventors: Johannes Petrus Maria Van Lammeren, Nijmegen (NL); Arnoldus Petrus Antonius Theodorus Sengers, Nijmegen (NL)

(73) Assignee: NXP B.V., Eindhoven (NL)

( * ) Notice: Subject to any disclaimer, the term of this patent is extended or adjusted under 35 U.S.C. 154(b) by 167 days.

(21) Appl. No.: 10/525,804

(22) PCT Filed: Jul. 31, 2003

(86) PCT No.: PCT/IB03/03709

§ 371 (c)(1),
(2), (4) Date: Feb. 25, 2005

(87) PCT Pub. No.: WO2004/021178

PCT Pub. Date: Mar. 11, 2004

(65) Prior Publication Data

US 2005/0233724 A1 Oct. 20, 2005

(30) Foreign Application Priority Data

Aug. 30, 2002 (EP) .................... 02078604

(51) Int. Cl.
*G06F 17/50* (2006.01)

(52) U.S. Cl. ............... 455/333; 716/1; 716/16; 716/17; 365/185.01; 365/185.18; 365/225.7; 711/100; 455/558

(58) Field of Classification Search ........... 326/39; 455/333, 558; 716/16, 17, 1; 714/55; 711/100, 711/101, 102, 103, 106, 149, 163; 365/94, 365/185.01, 189.01, 191, 230.02, 225.7, 365/185.18; 712/11

See application file for complete search history.

(56) References Cited

U.S. PATENT DOCUMENTS

| | | | |
|---|---|---|---|
| 5,621,650 A * | 4/1997 | Agrawal et al. ............... 716/16 |
| 6,239,604 B1 * | 5/2001 | Van Lammeren et al. ... 324/765 |
| 6,438,058 B2 * | 8/2002 | Acharya et al. .......... 365/225.7 |
| 6,438,737 B1 * | 8/2002 | Morelli et al. ................. 716/16 |
| 6,738,934 B2 * | 5/2004 | Frank et al. .................... 714/51 |
| 6,938,177 B1 * | 8/2005 | Blemel ........................ 713/500 |
| 7,024,654 B2 * | 4/2006 | Bersch et al. .................. 716/16 |
| 7,082,591 B2 * | 7/2006 | Carlson ......................... 716/16 |
| 7,120,427 B1 * | 10/2006 | Adams et al. ................ 455/418 |
| 2002/0124212 A1 * | 9/2002 | Nitschke et al. ................ 714/55 |
| 2003/0200510 A1 * | 10/2003 | Whitaker et al. ............... 716/1 |

FOREIGN PATENT DOCUMENTS

| | | |
|---|---|---|
| EP | 0 743 602 | 11/1996 |
| EP | 0 743 603 | 11/1996 |
| EP | 1 227 385 | 7/2002 |

* cited by examiner

*Primary Examiner*—Charles N Appiah
*Assistant Examiner*—Olumide T Ajibade Akonai

(57) ABSTRACT

A circuit module contains a sub-circuit that is capable of providing a level of performance dependent on the version number that is stored in a version number memory. The version number is passed to the sub-circuit from a write-protected memory to the version memory in the multiplex mode with normal operating signals for the sub-circuit. In one embodiment various commands for the circuit module are received from outside the circuit module and distributed in the circuit module via a communication bus. A watchdog monitors received commands for an update command that commands updating of the version number in the version number memory and if so it passes said update command to the communication bus, replacing a version number in the update command by a version number from the write-protected memory. In another embodiment the version number is passed to the sub-circuit in time-slot multiplexing with the signals that are processed, for example in a blanking period of a video signal that is being processed.

15 Claims, 1 Drawing Sheet

VERSION-PROGRAMMABLE CIRCUIT MODULE

The invention relates to a circuit module, to an integrated circuit for use in such a circuit module and to a method of controlling the version number of such a circuit module.

For various reasons it is often desirable to offer different versions of a basic circuit type for sale. Different versions may provide, for example, increasingly higher performance or may be dedicated to different types of applications. For example, the operating speeds or memory sizes of different versions of the basic circuit may differ, or certain functions such as floating point processing may be offered in one type and not the other. Offering such different versions makes it possible to adapt the price of the circuit dependent on the performance desired by the customer.

For manufacturing reasons and reasons of logistics, however, it is desirable that as small a number of different hardware configurations is manufactured, preferably only one version. To conciliate this requirement with the desire to offer different versions with different capabilities, the use of internal version numbers has been introduced. The basic circuit is manufactured in a configuration that is capable, in principle, of providing the maximum possible performance that can be offered by any version. The basic circuit contains a version number memory. Prior to delivery to the customer, a version number is written into the version number memory to set the capabilities of the circuit. During operation the circuit consults this version number memory. Dependent on the value of the version number in the version number memory the circuit uses or does not fully use the hardware available in the circuit. Thus, different versions of the basic circuit are supported by the same hardware.

To prevent abuse, it must be prevented that the version number in the version number memory can be overwritten by unauthorized persons after manufacture. This may be realized by using the version number memory as a write-protected memory, such as a PROM (Programmable Read Only Memory) or, more generally, an OTP (One Time Programmable) memory, which are known per se.

The need to provide a write-protected memory, however, causes additional costs to arise. These costs can be kept in check when the basic circuit is manufactured in large quantities, always with the OTP version number memory, as in the case of generically applicable circuits such as microprocessors. In any case these costs are unavoidable when the circuit constitutes a single integrated circuit. Nevertheless it is desirable to reduce the overhead costs.

It is inter alia an object of the invention to reduce the amount of write-protected memory for version number memory.

The invention provides a circuit module according to claim 1. According to the invention the version number is copied from a write-protected memory to the version number memory. Thus, a single write-protected memory suffices to give a protected version number to different circuit parts. This is particularly useful when the circuit is made from a combination of integrated circuits, such as in the case of an MCM (Multi Component Module), because in this case a single integrated circuit with a write-protected memory suffices. The other integrated circuits need not contain write-protected memory to support different version numbers. As understood herein the words "version number" refer to any data word that specifies the enabled capabilities of the circuit; it is not necessary that each possible value of such a data word specifies a possible set of enabled capabilities.

Dedicated connections may be used to pass the version number, but preferably, the version numbers are copied to the version number memory via a communication bus that may also be used to pass signals or commands other than commands for updating the version number through the circuit. Thus, no additional wiring is needed to support the version numbers. However, when other commands can be passed via the connection there is a risk that unauthorized persons may generate a command on the communication bus to change the version number in the version number memory. To prevent this, a watchdog circuit is added that monitors the commands. When the watchdog circuit detects a command to update the version number, the watchdog circuit passes this command to the communication bus, but in the command the watchdog circuit replaces the value that is to be stored by the version number from the write-protected memory. Thus, at the same time a general-purpose communication bus can be used to put the version number in the version number memory and writing of unauthorized version numbers is prevented.

On start-up of the circuit module a command to write any version number to the version number memory may be supplied to initialize the version number memory. The correct version number will automatically be substituted by the watchdog circuit.

Preferably, the integrated circuits that contain the version number memory are provided with an initializing circuit that initializes the version number on power up to a standard (low performance) version number value, independent of the actual version number that has to be used. Thus, a command to update the version number is required to increase performance, automatically causing the version number from write protected memory to be copied to the version number memory. At the same time the integrated circuit that contains the version number memory can be manufactured in generic form, without write protected memory for use in all versions of the basic circuit.

In another embodiment version numbers are copied to the version number memory via signal connections that are normally used to pass signals through the circuit, for example during a time slot in which no signal needs to be passed. In a video image signal processing circuit for example, a connection for passing video data may be used during the vertical blanking interval. The signal processing circuit copies the version number from these signal lines at a predetermined time during this interval. Preferably, the circuit is set to its fully enabled version if no signal is received, thus the circuit will have its full capability when used in circuits without version control.

Bits of the version number may be transmitted in parallel or in series, in the latter case another signal line may be used to clock transfer of the bits of the version number.

These and other objects and other advantageous aspects of the circuit module according to the invention will be described in more detail using the following Figures.

Figure 1:
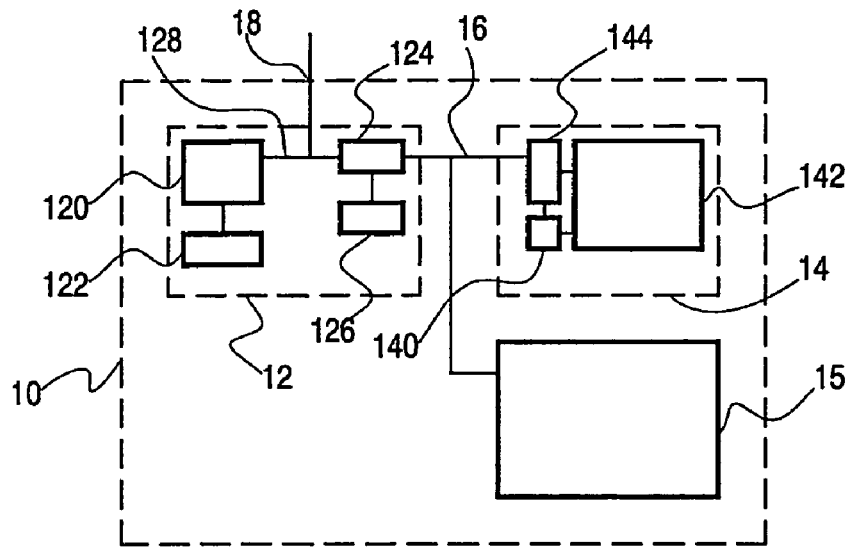
FIG. 1 shows an MCM module.

FIG. 1 shows an MCM module with a package 10. The MCM module comprises a processor integrated circuit 12, one or more signal processing integrated circuits 14, 15 and a communication bus structure 16 (such as an I2C bus, which comprises two conductors, a clock conductor SCL and a data conductor SDA, which are connected to all circuits). Processor integrated circuit 12 and the signal processing integrated circuits 14, 15 are coupled by communication bus structure 16. The MCM module has an external bus interface 18, which is accessible from outside package 10. In general the MCM module may have other terminals outside package 10 connected to the integrated circuits 12, 14, 15 inside the package, for passing signals that have to be processed and/or results of processing, but these have been omitted from the Figure for the sake of clarity. Communication bus structure 16 and preferably also integrated circuits 12, 14, 15 are not accessible from outside package 10 other than through the terminals of package 10. In particular, communication bus structure 16 is accessible only from external bus interface 18 via a watchdog circuit 124 in processor integrated circuit 12.

Processor integrated circuit 12 comprises a CPU 120, a non-volatile write-protected memory 122, a watchdog circuit 124 and a register 126. An internal bus 128 couples CPU 120 and watchdog circuit 124. Internal bus 128 is coupled to external bus interface 18. CPU 120 is coupled to write-protected memory 122. Watchdog circuit 124 is coupled to register 126 and to communication bus structure 16.

Signal processing integrated circuit 14 comprises a version number memory 140, a functional circuit 142 and a bus interface 144. Bus interface 144 is coupled between version number memory 140, communication bus structure 16 and (optionally) functional circuit 142. Functional circuit 142 is coupled to version number memory 140. Signal processing integrated circuit 15 is also coupled to communication bus structure 16 and may have a similar structure to signal processing integrated circuit 14.

In operation CPU 120 and functional circuit 142 perform various processing functions. The invention is not limited to any particular type of processing function. However, the nature of the processing function and/or the way in which the processing function is executed may depend on information that is stored in version number memory. For example, functional circuit 142 may keep certain of its circuits deactivated when the version number in version number memory 140 does not have a predetermined value. In another example, functional circuit 142 may set a clock frequency generated by functional circuit 142 to a maximum possible value only if a predetermined version number is present in version number memory 140.

Various types of commands may be passed between the integrated circuit 12, 14, 15 via bus communication structure 16. The instruction set of all possible commands that can be passed by communication bus structure 16 contains an update command for setting the value of the version number in version number memory 140. Bus interface 144 receives the commands from communication bus structure 16. When bus interface 144 detects an update command, it reads a new version number value from the update command and writes that version number value into version number memory 140.

Watchdog circuit 124 serves to pass commands from internal bus 128 (and thereby form external bus interface 18) to communication bus structure. Optionally, commands are also passed back from communication bus structure 16 to internal bus 128 (and external bus interface 18). Watchdog circuit 124 monitors the commands from internal bus 128 to detect update commands for updating the content of version number memory 140, for example by detecting write commands that contain an address of version number memory 140, or dedicated version number update commands. If a command from internal bus 128 is not an update command watchdog circuit 124 generally passes the command unaltered to communication bus structure 16. When watchdog interface 124 detects an update command from internal bus 128, watchdog circuit 124 outputs the command on communication bus structure 16, but with a substituted version number value, that corresponds to a version number read from write-protected memory 122. Thus, update commands from external bus interface 18 can only cause the version number from write-protected memory 122 to be written into version number memory 140.

Preferably, watchdog circuit 124 copies the version number from write-protected memory to register 126. Subsequently, watchdog circuit 124 substitutes the value from that register into update commands that it passes to communication bus structure 16. Thus, delays involved with reading write-protected memory 122 are avoided.

Write protected memory 122 may be of any type, such as a fuse or laser blown PROM etc. CPU 120 may use the version number in write-protected memory 122 to control performance as well. Preferably, CPU 120 is arranged to execute a hardwired boot program on start up (e.g. on reset or power up) to set the content of register 126 to the version number from write protected memory 122. Also, integrated circuit 14 preferably contains an initialization circuit that initializes the content of version number memory 140 on start-up to a standard value, which allows no more than a minimum of performance of functional circuit 142. The boot program of CPU, may contain an instruction to send a version number update instruction to communication bus structure 16. Any version number may be included in this instruction, since watchdog circuit 124 will substitute the version number from write-protected memory 122 in any case. Preferably CPU is programmed to send version number update commands periodically to correct any errors of the version number in version number memory 140.

Thus, the MCM module supports different version numbers, which leads to different performance using a write-protected memory 122 in only one integrated circuit 12. The version numbers are distributed to one or more other integrated circuits 14, 15 via a general purpose communication bus structure that remains available for passing all kinds of commands, including commands from outside the MCM package 12.

It will be appreciated that the invention is not limited to the embodiment shown. For example, watchdog circuit 124 may be included in the module outside the integrated circuit 12 that contains the write-protected memory. However, a watchdog circuit 124 in this integrated circuit 12 is preferred since it maximizes protection against tampering and minimizes complexity. Similarly, version number memory 140 need not be in the same integrated circuit 14 as functional circuit 142 that adjusts its performance according to the version number in version number memory 140. However, in order to simplify the circuit it is preferred to include version number memory 140 and functional circuit 142 in the same integrated circuit 14. Any number of version number memories 140 may be used. Also, although only a single write-protected memory is needed for the version number, any number of the integrated circuits in the module may of course contain such a memory themselves. Furthermore, although the invention has been illustrated for an MCM module, because the invention is particularly advantageous for such a circuit, which is often produced at a relatively smaller scale than integrated circuits, it will be understood that the invention can be applied to any type of circuit, including a single integrated circuit.

Figure 2:
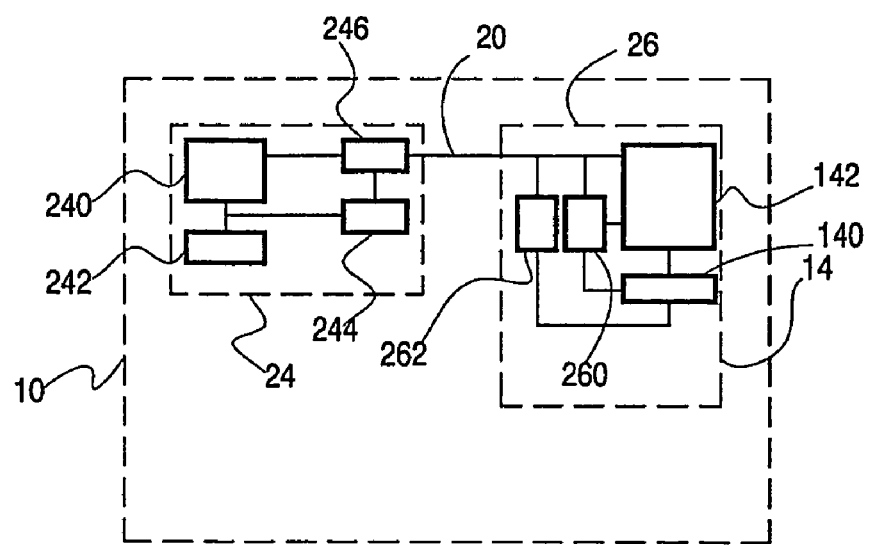
FIG. 2 shows a further MCM module

FIG. 2 shows a further MCM module with a package 10. The MCM module comprises processor integrated circuit 24, one or more signal processing integrated circuits 26 (only one shown) and signal communication link 20. Processor integrated circuit 24 and the signal processing integrated circuit 26 are coupled by communication link 20. In general the MCM module may also have various terminals outside package 10 connected to the integrated circuits 24, 26 inside the package, for passing signals that have to be processed and/or results of processing, but these have been omitted from the Figure for the sake of clarity. Communication link 20 and preferably also integrated circuits 24 are not directly accessible from outside package 10.

Processor integrated circuit 24 comprises a processing unit 240, a non-volatile write-protected memory 242, a version number transmitter 244, a multiplexing circuit 246. Write-protected memory 242 is coupled to processing unit 240 and to version number transmitter. Processing unit 240 and version number transmitter 244 are coupled to multiplexing circuit 244 which is coupled to communication link 20.

Signal processing integrated circuit 26 comprises a version number memory 140, a functional circuit 142, a demultiplexer 260 and a control circuit 262. Communication link 20 is coupled to functional circuit 142, control circuit 262 and to an input of demultiplexer 260. Demultiplexer 260 has an output coupled to version number memory 140. Functional circuit 142 has an input coupled to version number memory 140.

In operation, signals such as video signals are exchanged between processing unit 240 and functional circuit 142. Processing unit 240 and functional circuit 142 process these signals. Their performance (e.g. whether certain processing functions are supported) depends on the version number in write-protected memory 242 and version number memory 140. Version number transmitter 244 transmits a version number copied from write-protected memory 242 (or computed from the content of the write-protected memory) to signal processing integrated circuit 24 via communication link 20 in predetermined time-slots relative to other time slots that are used for normal signals. In case of a video for example, the version number may be transmitted during blanking periods, such as the vertical and/or horizontal blanking periods. Multiplexing circuit 246 transfers this signal to communication link 20 in this time slot. Control circuit 262 detects such a time slot, and instructs demultiplexer 260 to copy the version number that is received in the time slot to version number memory 140.

When communication link 20 is a parallel link with a number of different signal lines, bits of the version number may be transmitted in parallel. On or more of the signal lines may be used for passing a clock signal that clocks the version number. In this case version number transmitter 244 transmits this clock signal as well and demultiplexer 260 extracts the version number using the clock signal.

In a first embodiment, the performance level of signal processing integrated circuit 26 is set to a maximum performance in the absence of signals on communication link 20. Thus, when signal processing integrated circuit 26 is used in a circuit without version control it will assume its maximum performance without requiring further measures.

Although the embodiment of FIG. 2 has been described in terms of time-slot multiplexing, it will be understood that other forms of multiplexing may be used. For example, the version number may be multiplexed as a watermark in signals such as video information or use frequency or other code domain multiple access multiplexing.

The invention claimed is:

1. A circuit module comprising a first and second sub-circuit and a communication link coupled between the first and the second sub-circuit, the sub-circuits being arranged to communicate signals via the communication link during operation; the sub-circuit comprising a version number memory for storing a version number, the sub-circuit providing a performance dependent on the version number that is stored in the version number memory; the second sub-circuit comprising a write-protected memory and a version number control circuit arranged to send update values for the version number memory from the write-protected memory via the communication connection.

2. A circuit module according to claim 1 wherein the circuit module is a multi-component module, comprising a package that contains the first sub-circuit in a first integrated circuit and the second sub-circuit in a second integrated circuit.

3. A circuit module according to claim 1 wherein the control circuit is arranged to send the update values multiplexed with normal operating signals that are communicated between the first and the second sub-circuit.

4. A circuit module according to claim 3 wherein the communication connection is a communication bus coupled to the sub-circuits, the first sub-circuit being arranged to support execution of commands received via the communication bus, including an update command for updating the version number in the version number memory; the circuit module comprising: an external bus input: the version number control circuit being a watchdog circuit coupled between the external bus input and the communication bus, the watchdog circuit being arranged to pass commands from the external bus input to the communication bus conditionally, the watchdog circuit detecting whether the update command to update the version number is received and if so to pass said update command, replacing a version number in the update command by a version number from the write protected memory.

5. A circuit module according to claim 4, comprising a processor integrated circuit containing a CPU and the write-protected memory, the first sub-circuit being a signal processing unit distinct from the processor integrated circuit, the CPU being arranged to provide a performance dependent on the version number that is stored in the write-protected memory.

6. A circuit module according to claim 5, wherein the watchdog circuit comprises a register, the circuit module being arranged to write a copy of the version number from the write-protected memory in the register on power up, the watchdog circuit replacing the version number in the command by the version number from the register.

7. A circuit module according to claim 2, wherein the first sub-circuit is a signal processing circuit having an input and/or output for receiving and/or transmitting input signals to be processed or results of signal processing, the performance determining a processing capacity for processing said signals and/or producing said results, the input and/or output comprising the communication link over which the version number is communicated multiplexed with said input signals and/or or results.

8. A circuit module according to claim 7, wherein the first sub-circuit comprises a control circuit arranged to detect a predetermined times-lot in a predetermined format of the input signal or result and to cause data from the input and/or output that is received during said time slot to be copied to the version memory.

9. A circuit module according to claim 7, wherein input signal or result is a video signal the time slot being a blanking period in said video signal.

10. A processor integrated circuit comprising: a write-protected memory; operating circuits arranged to provide a performance dependent on a version number that is stored in the write-protected memory; an external bus input; a communication bus output, a watchdog circuit coupled between the external bus input and the communication bus output, the watchdog circuit being arranged to pass commands from the external bus input to the communication bus output conditionally, the watchdog circuit detecting whether an update command to update the version number is received and if so to pass said update command, replacing a version number in the update command by a version number from the write-protected memory.

11. A signal processing circuit comprising: a version number memory for storing a version number; operating circuits arrange to provide a signal processing with a performance dependent on a version number that is stored in a write-protected memory; an input and/or output for receiving and/or transmitting input signal to be processed or results of signal processing by said operating circuits; a control circuit arranged to detect multiplexed data in a predetermined format of the input signal or result and to cause data from the input and/or output that is received during a time slot to be copied to the version memory.

12. A method of controlling operation of a circuit module, the method comprising providing a performance level of a first sub-circuit dependent on the version number that is stored in a version number memory; passing a version number from a write-protected memory from a second sub-circuit of the circuit module to the version memory multiplexed with normal operating signals for the first sub-circuit.

13. A method of controlling operation of a circuit module according to claim 12, the method comprising: receiving commands for the circuit module and distributing the commands to the first sub-circuit via a communication bus; monitoring received commands for an update command that commands updating of the version number in the version number memory and if so to pass said update command to the communication bus, replacing a version number in the update command by a version number from the write-protected memory.

14. A method of controlling operation of a circuit module according to claim 12, the method comprising time-slot multiplexing the version number with the input signal to be processed or results of signal processing by said first sub-circuit.

15. A method of controlling operation of a circuit module according to claim 14, detecting a predetermined time-slot in a predetermined format of the input signal or result and copying data from the input and/or output that is received during said time slot to the version memory.

* * * * *